Oct. 31, 1961　　　M. A. LIBBEY　　　3,006,082
EDUCATIONAL DEVICE FOR TEACHING BINARY COMPUTATION
Filed Dec. 2, 1959　　　　　　　　　　　　　　　4 Sheets-Sheet 1

INVENTOR
Miles A. Libbey

BY Pierce, Scheffler & Parker
ATTORNEYS

Oct. 31, 1961  M. A. LIBBEY  3,006,082
EDUCATIONAL DEVICE FOR TEACHING BINARY COMPUTATION
Filed Dec. 2, 1959  4 Sheets-Sheet 2
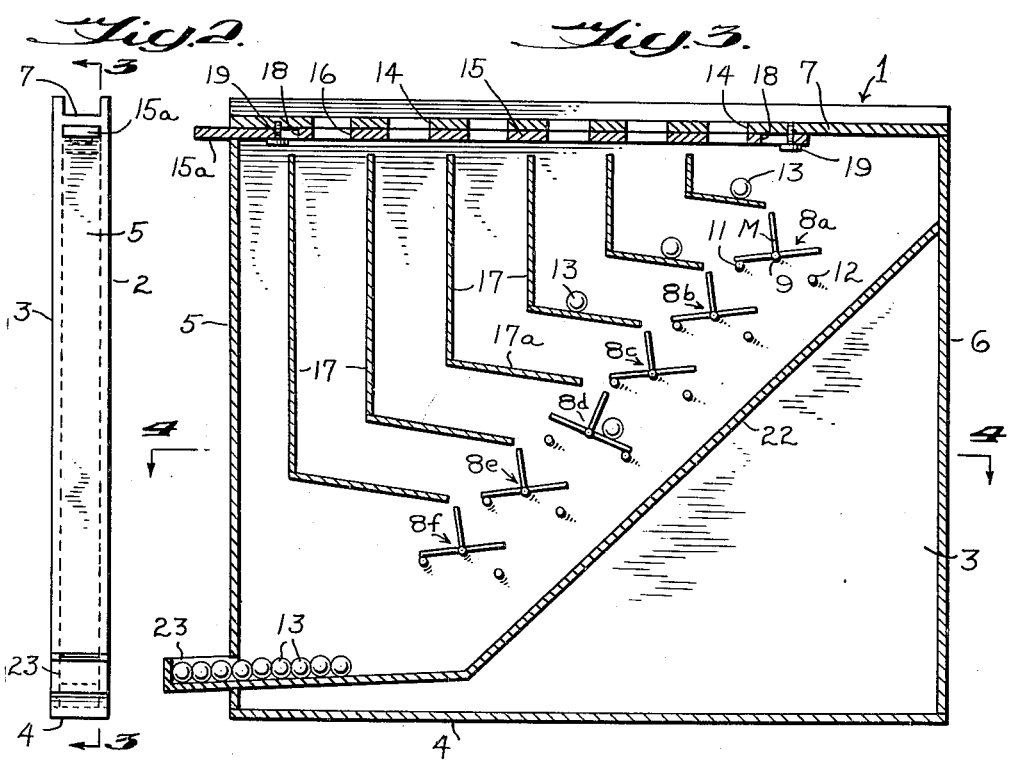
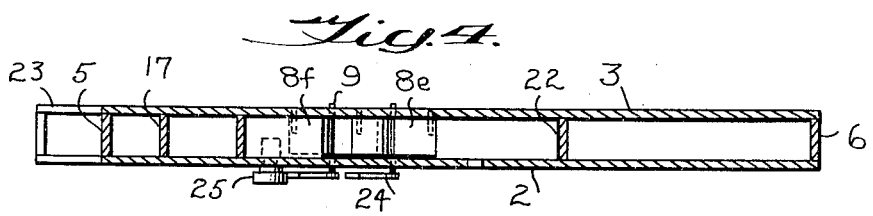
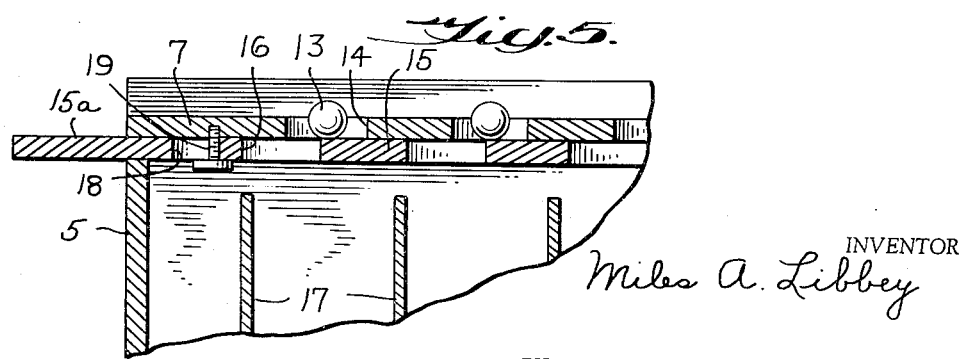
INVENTOR
Miles A. Libbey
BY Pierce, Scheffler & Parker
ATTORNEYS Oct. 31, 1961 M. A. LIBBEY 3,006,082
EDUCATIONAL DEVICE FOR TEACHING BINARY COMPUTATION
Filed Dec. 2, 1959 4 Sheets-Sheet 3

INVENTOR
Miles A. Libbey

BY Pierce, Scheffler & Parker
ATTORNEYS

United States Patent Office 3,006,082
Patented Oct. 31, 1961

3,006,082
EDUCATIONAL DEVICE FOR TEACHING BINARY COMPUTATION
Miles A. Libbey, 116 Court Road, Eltham SE. 9, London, England
Filed Dec. 2, 1959, Ser. No. 856,802
13 Claims. (Cl. 35—30)

This invention relates to a combined toy and educational device or machine designed principally for amusement and the teaching of a system of computation, and in particular for teaching the fundamentals of logic and of the binary or "radix two" system of computation.

The system of computation most familiar to the average student is the decimal system taught in the schools which has a base or radix of ten. Most people are however so familiar with the mechanics of computation under the decimal system that very little thought is ever centered on the underlying theory of the system and practically no knowledge of the theory is necessary in acquiring a working knowledge of the fundamental computations of addition, subtraction, multiplication and division.

In recent years, research has led to the development of a computing machine known generally to the public as the "electric brain" which is capable of working out extremely complicated problems in a relatively short time. Problems, the solutions of which, using the decimal system were formerly measured in days of working time can now be completed in a matter of minutes or at most a few hours. Primarily responsible for the success of one type of "electric brain" is the fact that it operates on a radix two or binary base. Each denomination of a number in a radix two is either 0 or 1. When 1 is added to a digit of a radix two number and the resultant comes to more than 1, 0 is entered for that digit and 1 is carried to the next digit. In a radix ten system 9 must be added to a digit in one order before a 1 is carried to the next digital order. In order to better understand the relationship between numbers in the radix ten and radix two systems, examples of corresponding numbers in both systems are given in the following table.

| Radix 10: | Radix two |
|---|---|
| 1 | 01 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |
| 16 | 10000 |
| 20 | 10100 |
| 25 | 11001 |
| 32 | 100000 |

It will be observed from the above table that a number expressed in radix two possesses a much larger number of digits (approximately three times) than the number of the same value expressed in radix ten, i.e. the normal decimal notation for a number, but the simplicity of representation of a digital value, and the simplicity of the calculating operations when performed in radix two compared with those performed in radix ten result in considerably less expensive equipment and in more rapid operation than in the case of calculating equipment in which the calculations are performed in radix ten.

Also, as noted in the table above, there are two possible values for any digit of a number expressed in radix two, namely 1 and 0. Accordingly the value of a digit of a number expressed in radix two can represented by the operated or unoperated condition of a relay, the relay being operated if the value be 1 and unoperated if the value be zero. The "electric brain" utilizes this basic principle.

It is believed desirable for one to appreciate the fact that there are systems of computation other than the conventional decimal system employed by occidental peoples for business purposes and hence the primary object of the present invention is to provide a comparatively simple and easily understood device for teaching the system of numbers expressed in radix two, and computations with numbers so expressed. Moreover by so learning the radix two system, one will therefore have a better understanding of the theory under which the "electric brain" machines operate.

An object of the invention therefore is to provide a novel binary computing machine. A more specific object is to provide a novel combined toy and educational device for performing addition of numbers expressed in radix two.

Another object is to provide a novel device for teaching the addition of numbers expressed in radix two and which features mechanically operated "flip-flop" relays which correspond in function to the electric relays employed in the more complicated "electric brain" machines.

In accordance with a more specific object of the invention, sequentially related, mechanical "flip-flop" relays actuated gravitationally by balls or the functional equivalent thereof serve to automatically perform calculating operations upon numbers set up in radix two in the machine by the positions of the balls and obtain the solution thereof as a number expressed in radix two.

In accordance with a more specific object of the invention, I provide a novel mechanically operated calculating machine for adding numbers expressed in a system of radix two wherein numbers in radix two are set up on the machine, the digits of such numbers being expressed by balls or the equivalent for each digit where the digital value is "1" which are arranged to actuate corresponding, sequentially related, mechanical "flip-flop" relays during the calculation process and wherein the final positions of the "flip-flop" relays after the calculations are completed function to indicate the solution as a number expressed in radix two.

Still another object of the invention is to provide a mechanical "flip-flop" element for use in a computing machine of the radix two type.

The nature of the invention will be better understood from the following description taken in conjunction with the accompanying drawings wherein:

FIG. 2 is an end elevation;

FIG. 3 is a vertical section on line 3—3 of FIG. 2;

FIG. 4 is a horizontal section on line 4—4 of FIG. 3;

FIG. 5 is a fragmentary vertical section of an upper part of the machine drawn to a larger scale;

Figure 1:
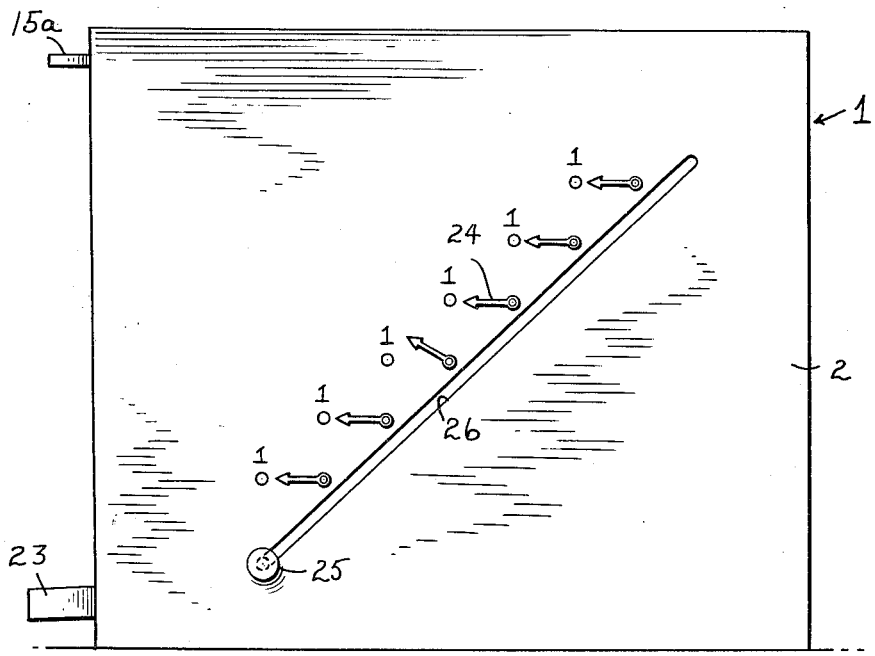
FIG. 1 is a front elevation of one embodiment of a binary computing machine in accordance with my invention.
Figure 7:
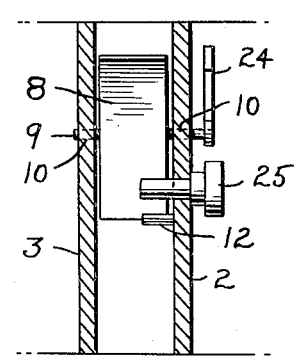
FIG. 7 is a section on line 7—7 of FIG. 6.
Figure 8:
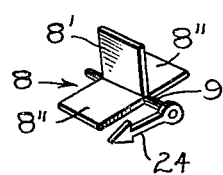
FIG. 8 is a perspective view of one of the mechanical, flip-flop relays utilized in the machine to represent a digital order.

With reference now to FIGS. 1–3, the computing machine is seen to be comprised of a rectangular, relatively shallow housing 1 made up of a front wall 2, rear wall 3, bottom wall 4, side walls 5, 6 and top wall 7. Each digital position or "order" of the computer is represented by a ball actuated, gravitationally operated "flip-flop" element or relay 8 pivoted intermediate its ends as shown in FIGS. 7 and 8 by means of a pivot pin 9 which extends through the element and is secured thereto. The opposite ends of pin 9 are rotatably supported in aligned recesses 10 in the front and rear walls 2, 3. The relay element 8 includes a vane or partition portion 8' extending normal to upwardly from and intermediate the arm portions 8" which assures proper operation of the relay as it "flips" or "flops" from one position to the other, the limits of movement of the element being fixed by stop pins 11, 12 against which the opposite ends of the element are adapted to abut.

As indicated in FIG. 3, the center of mass M of each relay 8 is located above the axis of pivot pin 9 so that the element will be in a stable state of equilibrium in both positions of rest against the stops 11, 12. It will be obvious however that other means may be employed to assure positive movement of the relay from one position to the other such as for example by incorporating an over-center spring mechanism not shown.

As previously stated, a flip-flop relay is required for each digital order, and in the present embodiment six such relays 8a–8f are included, thus making a six digit computer for performing problems in addition. These relays are arranged in stepped relation i.e. along a diagonal line, in the housing 1, the first element in the series corresponding to the first or lowest order digit being located topmost and at the upper right portion of the housing as viewed in FIG. 3.

Corresponding to each flip-flop relay 8 in the series is a ball feed by which a ball 13 or a functionally equivalent mass can be fed by gravity to the relay for tripping the same from the "0" to the "1" position or vice versa. In the present embodiment, the ball feed is comprised of a row of spaced holes 14 along and through the top wall 7, a strip or slide 15 beneath wall 7 slidably in contact with the under face of the latter and having holes 16 adapted to be brought into and out of registration with the holes 14 in wall 7 as strip 15 is slid back and forth, and channels from each hole 14 to its corresponding flip-flop relay 8 established by partitions 17 which are secured in position by and extend between the front and rear walls 2, 3. The lower portions 17a of these partitions slope downwardly so that the balls 13 when dropped thereon at the higher left side of 17a will roll downwardly and drop on one arm or the other of the relay 8.

While the balls 13 could be dropped singly through the various digital holes 14, I prefer to so arrange the machines that all balls can be placed in their proper digital positions to set up a binary number to be added, in much the same fashion that the various digits of a decimal number are entered in the conventional business adding machine. This objective is accomplished by means of the slide 15 having one end portion 15a thereof extending through the left side wall 5 for manual manipulation. The slide 15 is provided with longitudinally spaced key slots 18, and pins 19 in these slots having head portions overlying the marginal portions of the slots and entered into the top wall 7 serve to hold the slide 15 in place against the undersurface of wall 7 while permitting it to be reciprocated through a distance corresponding to the length of the slots 18 thus to move the holes 16 in slide 15 into or out of registration with the holes 14 in top wall 7.

When it is desired to set up a binary number in the computer, slide 15 is shifted to the position shown in FIG. 5 wherein the holes 16 do not register with holes 14, and balls 13 are placed in the proper holes 14 and held there, being supported by the slide 15. The slide 15 is then shifted to its other position, bringing the holes 16 into registration with holes 14 and permitting all balls to drop and pass to and actuate their respective flip-flop relays 8.

As previously explained, according to the binary or radix two system of computation, the value of a digit is either "1" or "0." Adding two "1's" in the same digit means the digit reading "0" and a "1" is carried to the next digit in the series. Consequently in the application of the binary system to the present computer, the several "flip-flop" relays are so arranged that a ball 13 going into an element such as for example 8a originally in the position shown in FIG. 3 and corresponding to a digital value of "0" is cast out after it has "flipped" the relay to its other position corresponding to a digital value of "1." A ball going into relay 8a originally in the "1" position and "flopping" that relay into the "0" position is not then cast out but rather descends by gravity to the next lower relay 8b corresponding to the next higher digital order and actuates that relay to its other position. If relay 8b is actuated to the "1" position, the ball will then be cast out. If however, relay 8b is actuated to the "0" position, the ball will not be cast out but rather will descend to and actuate the next lower relay 8c, etc. until all balls sent into the computer have completed their function and finally cast out. A sloping partition 22 is provided below the row of flip-flop relays 8 to collect the cast out balls 13 and return them to a storage point at the side of the housing formed by a channelled extension piece 23, and out of which the balls 13 may be taken for reuse in entering another binary addendum in the computer.

When entering a number in the computer, a ball is entered in each digital order where the value of the digit is "1." Where the value of a digit is "0" no ball is entered for that digit and the flip-flop relay corresponding thereto will not be actuated unless it receives a ball passed to it from the adjacent upper relay corresponding to the next lower digital order.

In order to "read" the positions of the several flip-flop relays 8 after a computation is completed, an indicator unit is included with each relay. In the embodiment of the invention illustrated in FIGS. 1–8, the indicator unit for each relay comprises a pointer 24 which as is most clearly seen in FIG. 7 is attached to the end of pivot pin 9 projecting through the front wall 2, and the indicia "0" and "1" inscribed or otherwise applied to the front wall. Depending upon the position of the relay 8, the pointer 24 will thus point to the "0" or "1" legend. Thus for the particular pointer positions shown in FIG. 1 the binary number is 001000 which corresponds to the number eight in the decimal system.

Figure 6:
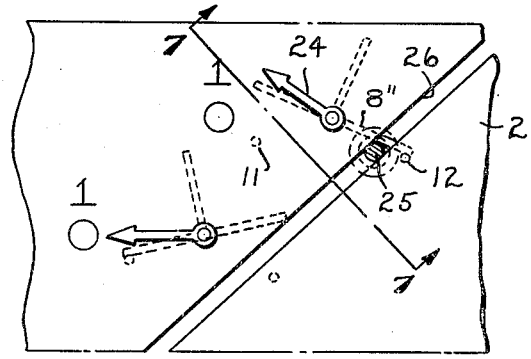
FIG. 6 is a fragmentary front elevation of the machine drawn to a larger scale to illustrate the resetting operation after completion of a computation.

To "zero" the computer, some means must be provided for returning all flip-flop relays to their "0" position. In the form of the invention which is illustrated, the "zeroing" device is constituted by a hand actuated reset pin 25 which is adapted to travel along an inclined slot 26 in the front wall 2. As shown in FIG. 6, pin 25 is adapted to engage the arm portion 8" of any relay resting in the "1" position as the pin is moved upwards along slot 26 flopping that relay back to its "0" position, clearing that relay and moving on to other relays similarly zeroing them.

In order that the principles of operation may be better understood, the front wall 2 of the casing may be made of transparent material thus enabling the user to see all of the relays and the manner in which they are actuated by the balls.

Figure 9:
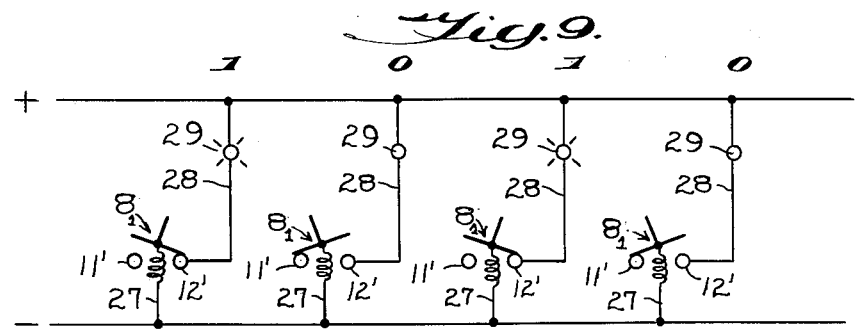
FIGS. 9–11 are electrical circuit diagrams showing different arrangements for interconnecting the flip-flop relays to indicate when a preselected condition of those relays obtains.

In lieu of a direct reader on the front of housing 1 to read the position i.e. "0" or "1" of the flip-flop relay, one can use a system of signal lights, there being one light assigned to each digit, i.e. to each flip-flop relay. FIG. 9 illustrates an arrangement wherein the signal light for a digit is illuminated when the flip-flop relay for that digit is in the "1" position. In this embodiment, the flip-flop relays are electrically conductive, a lead 27 is connected from each such relay $8_1$ to one side of a source of electrical power and another lead 28 is connected from the stop 12' (also electrically conductive) against which the flip-flop relay rests when in the "1" position through an indicator lamp 29 to the other side of the power source, thus lighting the lamp. Thus the radix two reading for the condition portrayed in FIG. 9 would be as indicated above the view, namely 1010. It is obvious that the opposite stop 11' for each flip-flop relay could be connected to the power source in lieu of the connections shown in FIG. 9, in which case the signal lamps 29 would be lit only when the flip-flop relay corresponding thereto was in the "0" position.

Figure 10:
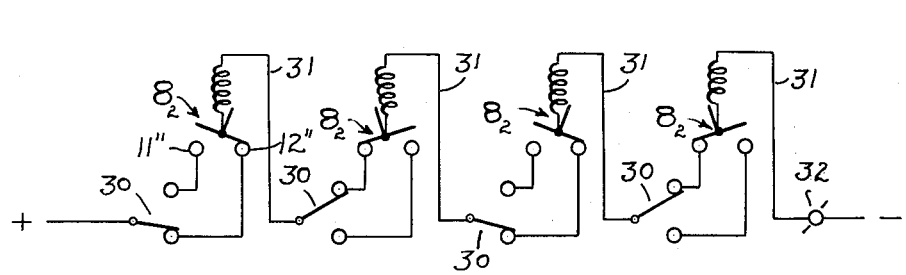

It is also possible to illuminate a signal lamp, activate a solenoid, electrical relay, etc. when the positions of the several flip-flop relays reach coincidence with a binary number set by using manually operated switches. Such an arrangement is illustrated in FIG. 10 wherein it will be seen that the several "flip-flop" relays $8_2$ are connectable in an electrical series and establish a continuous circuit therethrough only when the flip-flop relays occupy predetermined positions ("1" or "0"). To make this possible, a two position switch 30 is associated with the electrically conductive stops 11"—12" for each flip-flop relay. One position of the switch blade connects the latter to the stop 11" corresponding to the "0" position of the flip-flop relay, and in the other position of the switch blade, connection is made to the other stop 12" corresponding to the "1" position of the flip-flop relay. Each flip-flop relay is connected via conductor 31 to the switch blade of the switch 30 associated with the adjacent flip-flop relay. Hence by selecting the positions for the blades of the several switches in the group, a series circuit will be completed through the switches to a load element such as a lamp 32 only when the several flip-flop relays occupy the correct relative positions that establish circuit continuity from one switch to another.

Figure 11:
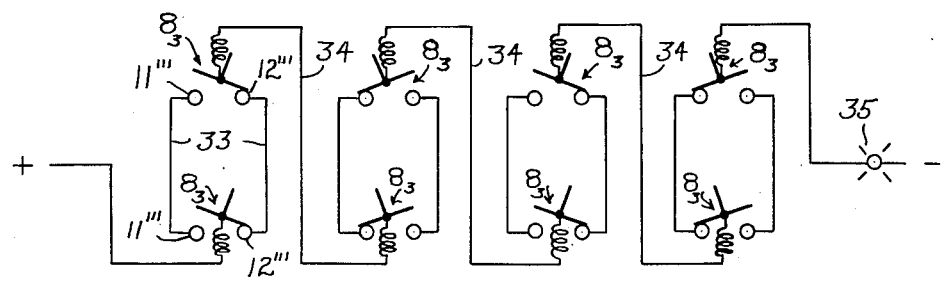

In an embodiment of the invention wherein two sets of flip-flop relays are utilized, it is also possible to electrically interconnect the flip-flop relays of the two sets in such manner that a signal lamp or other load will be energized when the flip-flop relays of one set correspond in position with the flip-flop relays of the other set. Such an arrangement is illustrated in FIG. 11 wherein it will be seen that the electrically conductive stops 11''', 12''' of the upper set of flip-flop relays 83 are connected by conductors 33 to the stops 11''', 12''' of the correspondingly positioned flip-flop relays 83 of the lower set. Moreover the flip-flop relays of the upper set are each connected via conductors 34 to the flip-flop relay in the adjacent digit of the lower set. Consequently only when the flip-flop relays of both sets occupy the positions shown in FIG. 11 will a series circuit be completed through all of them to energize the lamp 35 or other load or control element in the circuit indicated.

Figure 12:
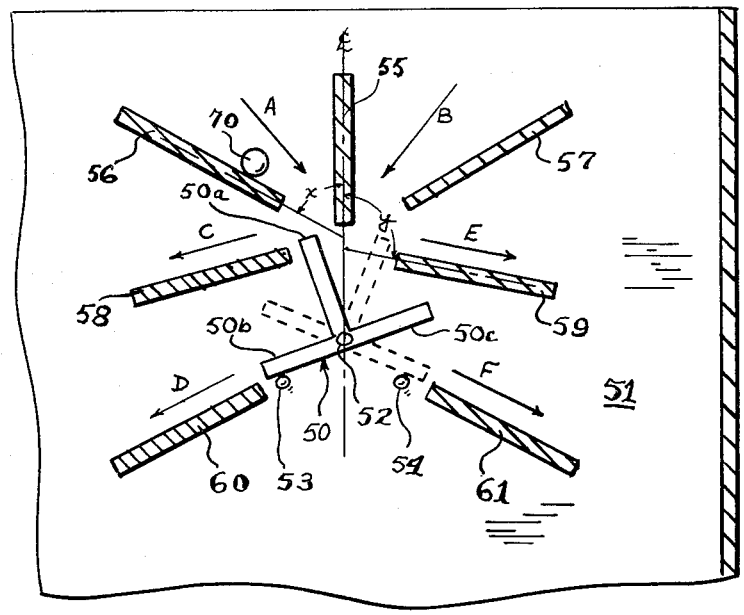
FIG. 12 is a vertical detailed sectional view of a flip-flop element embodiment having two possible inputs and four possible outputs.

FIG. 12 illustrates a flip-flop arrangement generally similar to that of FIG. 3 but having two possible inputs and four possible outputs. This embodiment not only will increase the various functional applications of my invention and permit an extension of range of the apparatus, but also the embodiment of FIG. 12 may be used for the teaching and explaining of the four-way truth tables and the like.

As shown in FIG. 12, the flip-flop element 50 is pivotally connected to the back wall 51 by means of the pivot pin 52. Stop 53 limits the movement of the flip-flop element 50 in the counter-clockwise direction to a first position illustrated in the drawing, and stop 54 limits the movement of the flip-flop element 50 in the clockwise direction to a second position illustrated by the phantom lines. Guide partitions 55 thru 61 are rigidly secured to the back wall 51. The inlet passages marked by the arrows A and B are defined between the guide partitions 55 and 56, and 55 and 57, respectively. Outlet passage C is defined between partitions 56 and 58, outlet passage D is defined between partitions 58 and 60, outlet passage E is defined between partitions 57 and 59, and outlet passage F is defined between partitions 59 and 61. It is to be noted that the pivot point 52 is located colinearly with respect to the axis of the partition 55, and that when the flip-flop element is in its first position the upper end 50a thereof extends between the adjacent extremities of the angularly inclined partitions 56 and 58, and when the flip-flop element is in the second position, the upper end 50a thereof extends between the partitions 57, 59. It should also be noted that the partitions 56 and 57 are each inclined by the acute angle "$x$" to the centerline "$\mathcal{C}$" of the partition 55, and the partitions 58, 59 are inclined by the obtuse angle "$y$" to the centerline "$\mathcal{C}$."

In operation, assuming that a ball 70 is introduced in inlet A and the flip-flop element 50 is in its first position, the ball 70 will fall by gravity and will contact the upper extremity 50a of the flip-flop, which extremity will divert the ball into outlet C. Should the flip-flop element be in its second position illustrated by the phantom lines and the ball 70 be inserted into inlet A, the ball will engage the left arm 50b of the flip-flop element to pivot the same to the first position, the ball being deflected off of arm 50b into outlet passage D.

Similarly, if a ball should be inserted into inlet passage B and the flip-flop element should be in its first position, the ball will contact flip-flop arm 50c to pivot the same to its second position, the ball being deflected by said arm into outlet passage F. Should the ball be inserted into inlet passage B when the flip-flop is in its second position, the ball will engage extremity 50a and be diverted thereby into outlet passage E.

Thus it is apparent that the embodiment of FIG. 12 having two possible inlets and four possible outlets materially increases the capacity of the apparatus and the various applications thereof.

While in accordance with the patent statutes I have illustrated the best forms and embodiments of my invention now known to me, it will be apparent to those skilled in the art that other changes and modifications may be made in the apparatus described without deviating from my invention set forth in the following claims.

I claim:

1. A binary computer structure comprising a frame, a double-armed relay member, means pivotally connecting said member intermediate its arms to said frame, said member being stable in one position of repose about its pivot axis corresponding to a binary value "0" position of the relay and being also stable in another position of repose about its pivot axis corresponding to a binary value "1" position of the relay, said member also having a vane projecting laterally therefrom intermediate said arms, a mass movable gravitationally along said frame, and guide means on said frame for directing said mass into engagement with said vane for deflection thereby onto one or the other of said arms depending upon the initial stable position of said member, said mass functioning to displace said member from the initial position of repose to another stable position of repose, and having a dimension corresponding to the dimensions of either arm of the relay member and such that one mass only can pass the relay at any one time.

2. In a mechanically operated binary computer the combination comprising a plurality of pivotally mounted flip-flop relays stable in either of two positions arranged in series, one such position of each relay corresponding to a binary value of "0" and the other of said positions corresponding to a binary value of "1," said relays being arranged in series and with each one positioned higher than the next adjacent one in the series, and a mass individual to and movable gravitationally into engagement with each of said relays to actuate the latter from one position to the other, said relays being arranged such that a mass actuating one of said relays to the "1" position is cast out and a mass actuating one of said relays to the "0" position is passed downwardly to and actuates the next adjacent relay in the series from one position to the other.

3. In a mechanically operated binary computer the combination comprising a plurality of pivotally mounted mechanical flip-flop relays arranged progressively in height, said relays being stable in either of two positions, one of said positions corresponding to a binary value of "0" and the other of said positions corresponding to a binary value of "1," ball members, and guide means cooperative with said relays for gravitationally delivering said ball member into engagement with and actuation of said relays from one to the other of the said stable positions thereof, said ball members being thereafter deflected by said relays to one of two paths, one of said paths leading to the next lower positioned relay whereby said ball also actuates said next lower relay from one to the other of its two stable positions.

4. In a mechanically operated binary computer the combination comprising a casing, a series of pivotally mounted flip-flop relays arranged in series in said casing and with each relay positioned higher than the next adjacent one in the series, each of said relays being stable in either of two positions, one such position of each relay corresponding to a binary value of "0" and the other position of said relay corresponding to a binary value of "1," a plurality of balls, ball guide means in said casing leading to each of said relays by which said balls each representative of a different binary digital order may be delivered to the relay pertaining thereto for actuation of the relay from one to the other of the said two positions thereof, said relays being arranged such that a ball actuating one of said relays to the "1" position is cast out whereas a ball actuating one of said relays to the "0" position is passed downwardly to and actuates the next lower relay in the series from one position to the other.

5. A binary computer as defined in claim 4 and which further includes guide means in said casing positioned below said relays for returning cast out balls to a pick up point for reuse.

6. A binary computer as defined in claim 5 and which further includes a set of openings in the top wall of said casing leading respectively into each of the said guide means to the several relays for receiving said balls, a slide member positioned adjacent said top wall having a set of openings therein corresponding to the openings in said top wall, and means mounting said slide member for movement transversely of said top wall to bring said sets of openings into and out of registration whereby with said sets of openings out of registration a binary number may first be entered in said computer by placing balls in the proper openings of said first set and thereafter by moving said slide to bring said sets of openings into registration all of said balls will then be delivered to the various relays.

7. A binary computer as defined in claim 4 wherein each of said relays is constituted by a doubled arm member mounted pivotally intermediate the arms and having a vane upstanding between the arms.

8. A binary computer as defined in claim 7 wherein the center of mass of said relay is located in the vane and above the pivot axis.

9. In a binary computer of the mechanical type of the combination comprising a plurality of interrelated seriately arranged flip-flop relay members each pivotally mounted for actuation between two stable positions determined by stops in each position, one position of each relay member corresponding to a binary value of "0" and the other position corresponding to a binary value of "1," said relay members and said stops being electrically conductive, ball means acting gravitationally for actuating said relay members first circuit means connecting one of said stops to one side of a source of power and second circuit means including an electric indicating device connecting said relay member to the other side of said source of power.

10. In a binary computer of the mechanical type the combination comprising a plurality of interrelated seriately arranged flip-flop relay members each pivotally mounted for actuation between two stable positions determined by stop means in each position, one position of each relay member corresponding to a binary value of "0" and the other position corresponding to a binary value of "1," said relay members and said stops being electrically conductive, ball means acting gravitationally for actuating said relay members, and circuit means including switch means for selectively connecting each relay member to either one of the stops of the adjacent relay member in the series.

11. In a binary computer of the mechanical type, the combination comprising first and second sets of interrelated seriately arranged flip-flop relay members each pivotally mounted for actuation between two stable positions determined by stop means in each position, one position of each relay member corresponding to a binary value of "0" and the other position corresponding to a binary value of "1," the relay members and stop means of each set being electrically conductive, ball means acting gravitationally for actuating the relay members of both sets, circuit means inter-connecting corresponding stops of digitally corresponding relay members of each set, and circuit means connecting each relay member of said first set with the next adjacent relay member of said second set.

12. A basic logical decision device comprising a generally vertical wall, a double-armed flip-flop element pivotally connected intermediate its arms to said vertical wall for pivotal movement about a horizontal axis, said member being stable in a first position of repose about said pivotal connection and also being stable in a second position of repose about said pivotal connection, means connected to said vertical wall defining a pair of inlet passages above said flip-flop element, a pair of outlet passages on one side of said flip-flop element, and a second pair of outlet passages on the other side of said flip-flop element, and a mass movable gravitationally downwardly through one of said outlet passages, the outlet passage through which said mass passes being a function of the particular inlet passage through which it was introduced and also a function of the initial position of repose of the flip-flop element.

13. Apparatus as defined in claim 12 wherein said flip-flop element has the configuration of an inverted T, the extremity of the vertical portion of said T being removably positioned in the entrance of one of said outlet passages to prevent entry of the gravitational mass thereto when said flip-flop element is in a position of repose.

References Cited in the file of this patent

UNITED STATES PATENTS

| | | |
|---|---|---|
| 900,658 | Bristol | Oct. 6, 1908 |
| 936,648 | Marshall | Oct. 12, 1909 |
| 957,135 | Asbury | May 3, 1910 |
| 2,052,513 | Kimball et al. | Aug. 25, 1936 |
| 2,115,620 | Cave | Apr. 26, 1938 |
| 2,122,024 | Chouinard | June 28, 1938 |
| 2,175,971 | Perry | Oct. 10, 1939 |
| 2,658,972 | Brown | Nov. 10, 1953 |

FOREIGN PATENTS

| | | |
|---|---|---|
| 816,817 | Great Britain | July 22, 1959 |